(12) United States Patent
Willman

(10) Patent No.: US 6,213,237 B1
(45) Date of Patent: Apr. 10, 2001

(54) MOTORCYCLE STOP SUPPORT WHEELS

(76) Inventor: David Willman, 1234 Margina Ave., Daytona Beach, FL (US) 32114

( * ) Notice: Subject to any disclaimer, the term of this patent is extended or adjusted under 35 U.S.C. 154(b) by 0 days.

(21) Appl. No.: 09/178,354

(22) Filed: Oct. 23, 1998

(51) Int. Cl.[7] .................................................. B62K 13/00

(52) U.S. Cl. ............................. 180/209; 73/494; 180/21; 180/219; 280/297; 280/301; 280/303; 280/755

(58) Field of Search ........................... 180/209, 21, 219; 280/293, 755, 297, 301, 303; 73/489, 491, 494, 493

(56) References Cited

U.S. PATENT DOCUMENTS

| | | | |
|---|---|---|---|
| 4,811,807 | * | 3/1989 | Schier .................................... 180/219 |
| 5,511,435 | * | 4/1996 | Kitamura et al. ..................... 73/865.9 |
| 6,022,037 | * | 2/2000 | Code ...................................... 280/303 |

FOREIGN PATENT DOCUMENTS

282333 * 9/1988 (EP) ..................................... 180/219

* cited by examiner

*Primary Examiner*—Eric Culbreth
(74) *Attorney, Agent, or Firm*—Brian S. Steinberger; Law Offices of Brian S. Steinberger (57) ABSTRACT

Lockup hydraulic valve system for controlling side swing arm supported wheels on a motorcycle when the wheels are in a downward ground engaging position. The valve system has an open-unlocked and closed-locked position. In the unlocked position, a driver riding the motorcycle about turns where the bike tilts either to the right or to the left allows the corresponding side wheel to move upward. Also in the unlocked position, the side wheels will raise when the motorcycle is running over uneven road surfaces. In the locked position, the side wheels stay in a rigid/fixed downward position while the motorcycle is standing still up to speeds of approximately 15 mph. Magnets attached to the front wheel along with a pickup sensor determine the speed of the motorcycle. Above, 15 mph, a relay activated safety switch overides the locked position putting the valve controls into the unlocked position. A handle bar mounted toggle switch with corresponding colored panel indicates to the driver the positions of the valve controls.

16 Claims, 6 Drawing Sheets

MOTORCYCLE STOP SUPPORT WHEELS

This invention relates to side wheels for motorcycles, and in particular to a side wheels which can stay in a locked down position while the motorcycle goes from standing up to speeds of 15 miles per hour, and includes a safety overide feature for preventing the wheels from being permanently locked down. This invention is related to U.S. Pat. No. 5,029,894 to Willman, the inventor of the subject invention, which is incorporated by reference.

BACKGROUND AND PRIOR ART

Large touring motorcycles such as the Harley Davidson FLH TC 1340 cc which weigh over 800 pounds can be difficult to both balance when the bike is standing still, moving forward or backward and especially through turns. Many attempts have been made over the years that try to hold a motorcycle upright and allow the pleasure of balancing the bike during a ride.

The inventor of the subject invention created "retractable motorcycle stop-support wheels" which limited operation of motorcycle side wheels to be either an up mode or a down mode. See U.S. Pat. No. 5,029,894 to Willman, which is incorporated by reference. The up mode has the side wheels in a permanent lock up position raised above ground level. The down mode has the side wheels in a permanent lock down position with both wheels abuting against the ground. This system was beneficial for allowing the cyclist to have upright stability of the motorcycle in stop-and-start traffic, for parking and for handling the motorcycle when it was not being ridden. However, each of the side wheels in the Willman '894 patent were not intended to be flexible to bend upward to follow the uneven road surface contours while the motorcycle is travelling. Furthermore, the Willman device was not meant to be used in a down position mode when the motorcycle was travelling during turns when the motorcycle is typically tilted and the downward positioned sidewheels would be flexible to follow the contours of the road.

Other lockup and lockdown stabilizer wheels have been proposed but also fail to be useful for allowing the side wheels to be used when the motorcycle is travelling and especially being used over rough uneven road contours nor being useful during turns when the motorcycle is traditionally tilted. See U.S. Pat. No. : 3,397,898 to Denney; U.S. Pat. No. 4,536,009 to Ashworth; U.S. Pat. No. 4,815,756 to Kitner; and U.S. Pat. No. 4,826,194 to Sakita These prior art devices would also be hazardous when used in a lock down fixed position during traveling and/or going through turns since the cyclist could lose control causing injury and damage to both the cyclist and the motorcycle. Still furthermore, many of these prior art devices are expensive to attach, unsightly to be seen and unreliable during use.

SUMMARY OF THE INVENTION

The first objective of the present invention is to provide attractive, reliable low cost and convenient ground engaging side wheels for large motorcycles that can be used while the bike is touring .

The second object of this invention is to provide ground engaging side wheels for motorcycles that follow the uneven road surface contours while the motorcycle is moving.

The third object of this invention is to provide adjustable ground engaging side wheels for motorcycles that can be used when a motorcycle is being tilted during turns.

The fourth object of this invention is to provide a ground engaging side wheels system for motorcycles that prevents both side wheels from being locked in a fixed down position while the motorcycle is travelling at speeds greater than approximately 15 miles per hour.

A preferred embodiment of the invention includes a toggle control switch mounted on one of the handlebars of the motorcycle having two positions for use after side wheels are engaging the ground, or after side wheels have been lowered as described in U.S. Pat. No. 5,029,894, which has been incorporated by reference. The handlebar mounted switch controls hydraulic valves having an open unlocked position and a closed locked position for sidewheel mounted swing arms which support the side wheels. In an unlocked position, each of the side wheels can move upward depending upon the contour of the ground and when the motorcycle is being tilted at all times regardless of speed.

The closed lock position of the switch causes the hydraulic valves on both sides of the motorcycle to close hydraulic cylinders and pistons extending from hydraulic cylinders to stay rigid against downwardly positioned swing arms connected to the two side wheels. The two side wheels stay locked in a ground engaging down position while the motorcycle is at a full stop and through speeds of up to approximately 10 to 15 miles per hour(mph) allowing the motorcycle to be ridden like a tricycle. Above approximately 15 mph, the lockup valves controlling the hydraulic cylinders are open, allowing oil to flow into a motorcycle frame supported compensator tank. When the motorcycle is tilting to the left or to the right up to approximately 55 degrees from the vertical, the corresponding downwardly positioned side wheel can rise upward while following the tilting bike. Also, each of the side wheels can move upward and downward while following the uneven ground contours during speeds in excess of approximately 15 mph. Threshold speed of approximately 15 mph can be adjusted up or down.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the devils of the particular arrangement shown since the invention is capable of other embodiments. Also, the terminology used herein is for the purpose of description and not of limitation.

Figure 1:
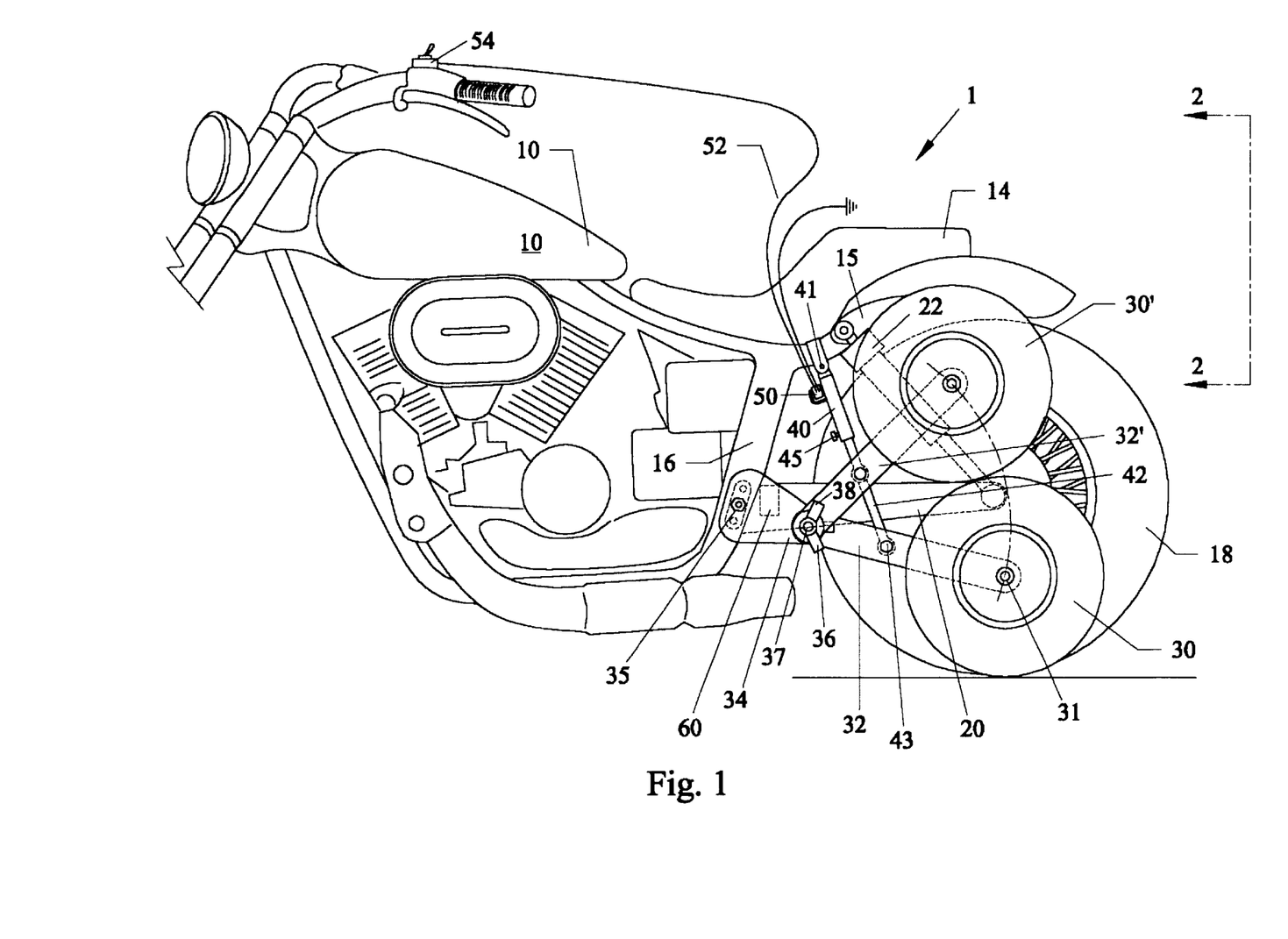
FIG. 1 is a sectional left side view of the rear wheel section of a large motorcycle with a side wheel.

FIG. 1 is a sectional left side view of the rear wheel section of a large motorcycle such as the 800+ pound, Harley Davidson FLH TC-1340 cc, 80 cubic inches, with left side wheel in a ground engaging position 30. Side wheel 30 can move up to an upper raised position 30' as will be described. Referring to FIG. 1, motorcycle 10 includes handlebar 12, main frame 16, rear wheel 18 connected to frame 16 by rear wheel support fork 20 and a vertical shock absorber 22 between wheel support fork 20 and seat support frame 15. The invention includes left support wheel 30 pivotally connected by a short left axle 31 to one end of a longitudinal left swing arm 32, and an opposite end of left swing arm 32 connected to mounting plate 34, the latter of which is attached to motorcycle frame 16 by attachment bolts 35. An electronic toggle tppe switch 54 that can be mounted on the motorcycle handlebar 12 can be activated to control a control valve 50, such as a 12 volt hydraulic 3500 pound lockup valve(which is ground connected to the frame 16 and to the motorcycle battery(not shown)), for controlling hydraulic cylinder 40 having a piston 42 with an exterior end 43 pivotally attached to mid-portion of left swing arm 32. Hydraulic cylinder 40 has an upper end 41 pivotally attached to seat support frame 15. A vent 45 allows for valve 40 to have increased fluid pressure or to lower fluid pressure therein.

Figure 2:
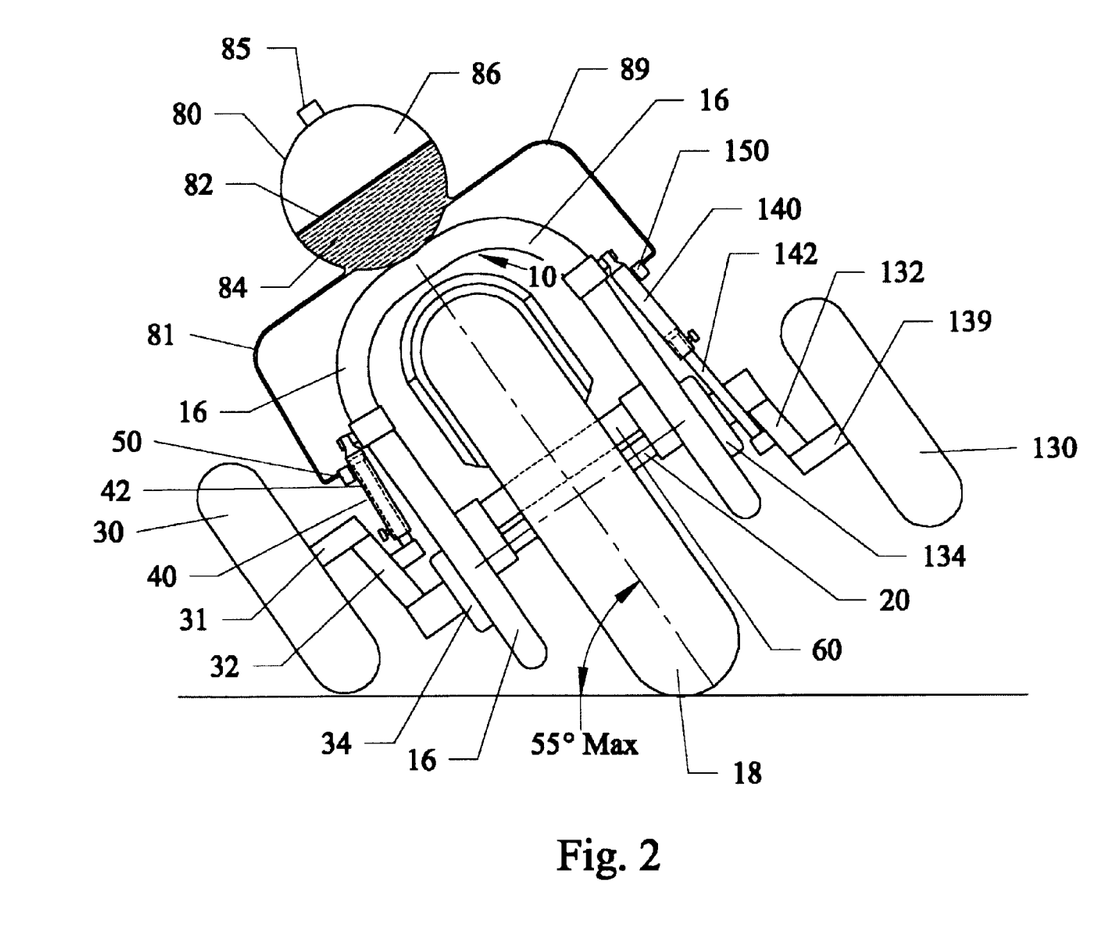
FIG. 2 is a rear view of the rear wheel section of the motorcycle of FIG. 1 along 2—2 while the motorcycle is being tilted sideways to the left with the both lockup valves in an open position.
Figure 3:
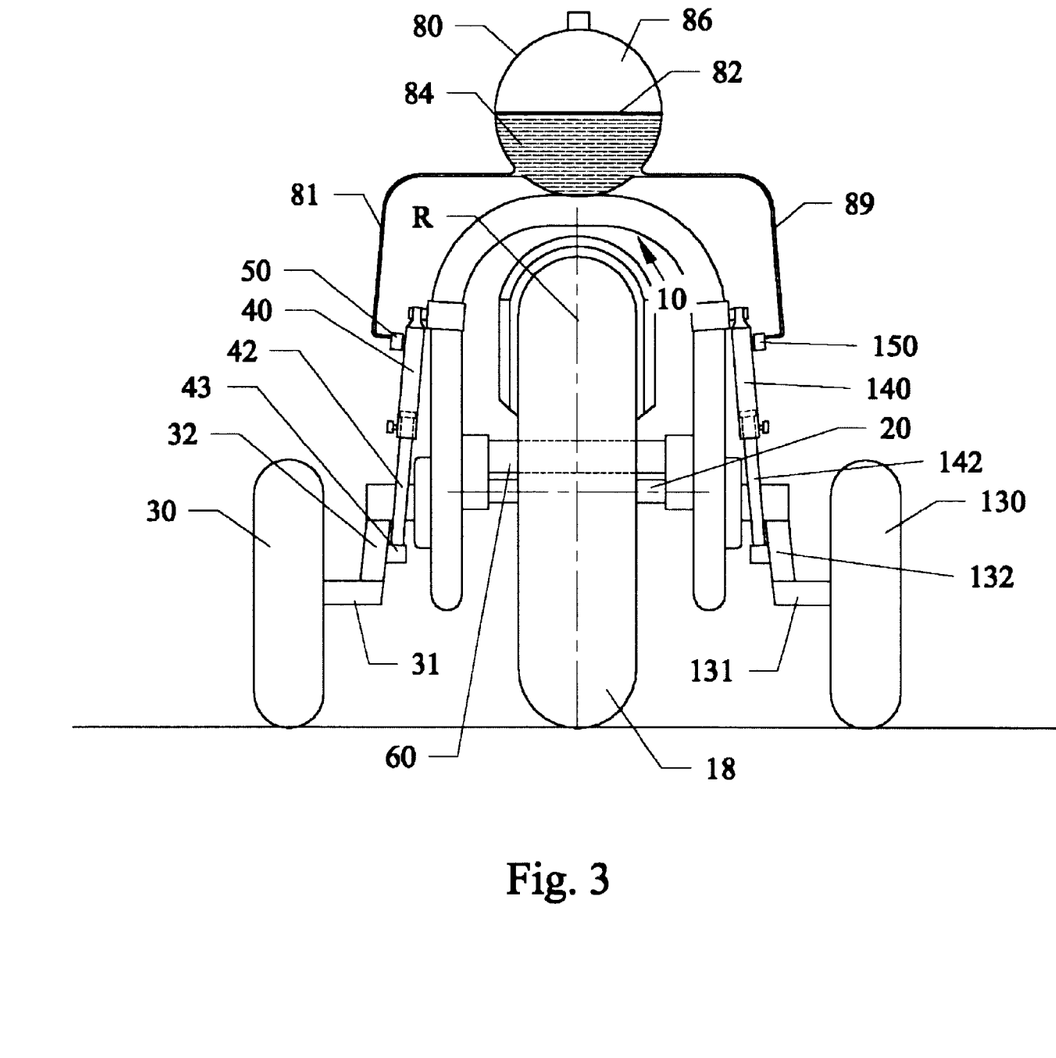
FIG. 3 is a rear view of the rear wheel section of the motorcycle of FIG. 1 along 2—2 while the motorcycle is fully upright with both lockup valves in an open position.

Referring to FIGS. 1 and 3, initially, both side wheels 30, 130 are in a ground engaging position on both sides of the motorcycle 10. A seated driver(not shown) activates invention 1 by using toggle switch 54 to move the hydraulic control system shown and described in reference to FIGS. 2–6 between a closed lock position and an unlocked position. In the closed lock position, the side wheels 30, 130 are fixed in a ground engaging position while the motorcycle is standing still up to travelling speeds of approximately 10 to approximately 18 miles per hour. In the locked position, relay 210(FIG. 6) is closed and pistons 42 and 142 are fixed in their most extended position from cylinders 40 and 140, respectively. Above those speeds, the hydraulic control system automatically switches to an unlocked position so the side wheels 30, 130 are flexible to move upward while the motorcycle passes over uneven ground contours, abutments, and the like. The flexibility allows left support arm 32 and side wheel 30 to be movable between a down position to an up position 30', where an up stop 38 abuts against the upper edge of left swing arm 32 to limit the up position of the left swing arm 32', and a down stop 36 abuts against the lower surface edge of left swing arm 32 to limit the down position of the left swing arm 30. The range of motion of swing arm 32 can range up to arm position 32'.

FIG. 2 is a rear view of the rear wheel section of the motorcycle 10 of FIG. 1 along 2—2 while the motorcycle 16 is being tilted sideways to the left with the both lockup valves in an open position at speeds of above approximately 15 miles per hour. The safety activation feature which allows the lockup valves to move to an open position will be described in reference to to FIG. 6.

Referring to FIG. 2, left lockup valve 50 and right lockup valve 150 are both switched to the open position by toggle switch 54(FIG. 1) which enables left side wheel 30 and right side wheel 130 to be in a down position. Main swing arm bar 60 connects to the mounting plates 34, 134. Mounting plate 34 can be a one inch thick steel plate with a one inch hole drilled through it for a one inch diameter axle 37 for the pivot arm 32 to pivot on. This axle 37 goes all the way through the mounting plate 34 and is on both the inside and the outside of the plate 34. Mounting plate 34 is fastened to the motorcycle main frame 16 by bolts 35. In order to eliminate wear about the pivot point surrounding axle 37 inside plate 34 can be timpkin tapered caster bearings(not shown), which are similar to those found in the front end of automobile steering gears.

While motorcycle 10 tilts leftward up to approximately 55 degrees from the vertical left piston 42 compresses into hydraulic cylinder 40, wherein oil travels from cylinder 40 to motorcycle frame mounted compensator tank 80, which has an interior diaphragm 82 separating oil 84 within the tank 80 from air 86. FIG. 2 shows a schematic view of tank 80. The air 86 can be prepressurized to approximately 20 pounds per square inch(psi). An external air valve 85 can be used to increase or decrease pressure within compensator tank 80. The prepressurized air portion 86 of tank 80 allows for oil travelling through line 81 to be able to move diaphragm 82 upward, and allow left wheel 30 to move upward while motorcycle 10 is tilted toward the left. Simultaneously, right side wheel 130 supported by right swing arm 132 stays in a downward position. Remaining components 131, 134, 140, 142, 150 correspond to like components described in FIG. 1.

FIG. 3 is a rear view of the rear wheel section of the motorcycle 10 of FIG. 1 along 2—2 while the motorcycle 10 is fully upright with both lockup valves 50, 150 in an open position. When handlebar mounted toggle switch (54 FIG. 1) is switched on, lockup valves 50, 150 move to a closed position where piston rods 42, 142 extend out from hydraulic cylinders 40, 140 causing left side swing arm 32 and right side swing arm 132 to lower side wheels 30, 130 to a downward ground engaging position. Down stops 36(only one is shown in FIG. 1) attached to opposing mounting plates 34, 134 limit the downward movement of the respective left and right swing arms 32, 132. The right and left lockup valves 50, 150 remain closed while the motorcycle 10 is at a full stop and during speeds up to approximately 10 to 15 miles per hour(mph) so that the downwardly angled left and right side swing arms 32, 132 are rigid allowing side wheels 30, 130 to stay in their downward position allowing the motorcycle to be ridden like a tricycle. When the motorcycle passes over speeds of approximately 15 mph, the lockup valves 50, 150 move to an open position where both the side wheels 30, 130 stay in a downward position for running on a level road. As previously explained, having the lockup valves 50, 150 in an open position at speeds of above 15 mph, allows each of the side wheels 30, 130 to be able rise upward or downward when following uneven and rough ground contours.

Figure 4:
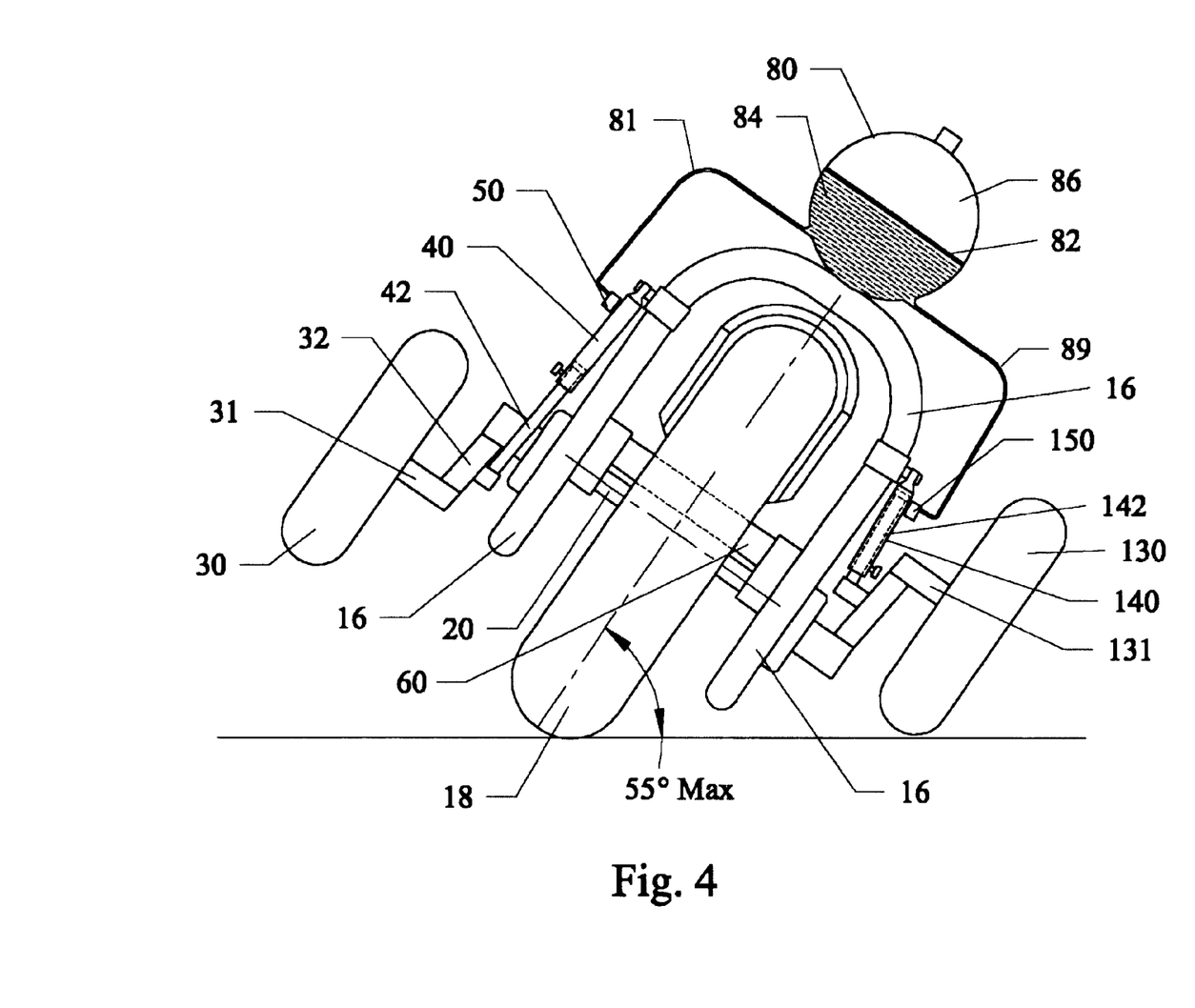
FIG. 4 is a rear view of the rear wheel section of the motorcycle of FIG. 1 along 2—2 while the motorcycle is being tilted sideways to the right with both lockup valves in an open position.

FIG. 4 is a rear view of the rear wheel section of the motorcycle of FIG. 1 along 2—2 while the motorcycle is being tilted sideways to the right with both lockup valves in an open position at speeds above approximately 15 miles per hour. Referring to FIG. 4, left lockup valve 50 and right lockup valve 150 are both switched to the open position by toggle switch 54(FIG. 1) which enables left side wheel 30 and right side wheel 130 to be in a down position. Main swing arm bar 60 connects to the mounting plates 34, 134. While motorcycle 10 tilts rightward up to approximately 55 degrees from the vertical, right piston 142 compresses into hydraulic cylinder 140, wherein oil travels from cylinder 140 to motorcycle frame mounted compensator tank 80, which has an interior diaphragm separating oil 84 within the tank 80 from air 86. FIG. 2 shows a schematic view of tank 80. The air 86 can be prepressurized to approximately 20 pounds per square inch(psi). An external air valve 85 can be used to increase or decrease pressure within compensator tank 80. The prepressurized air portion 86 of tank 80 allows for oil travelling through line 89 to be able to move diaphragm 82 upward, and allow right wheel 30 to move upward while motorcycle 10 is tilted toward the right. Simultaneously, left side wheel 30 supported by left swing arm 32 stays in a downward position.

The fluid flow between cylinders 40 and 140 with valves 50 and 150 in an open unlocked position while the bike is leaning to the right, the left or is level is described in reference to FIGS. 2–4. Referring to FIG. 2, with both valves 50 and 150 open, and the bike 10 is leaning to the left, the fluid is moved out of cylinder 40 over into cylinder 140. When the bike 10 is leaned to the right as shown in FIG. 4, the fluid is moved out of cylinder 140 back over to cylinder 40. When back on level ground as shown by FIG. 4 and bike 10 is in a vertical position, the fluid is equally distributed between both cylinders 40, 140. Under these conditions, the rider maintains a normal balanced ride.

Figure 5:
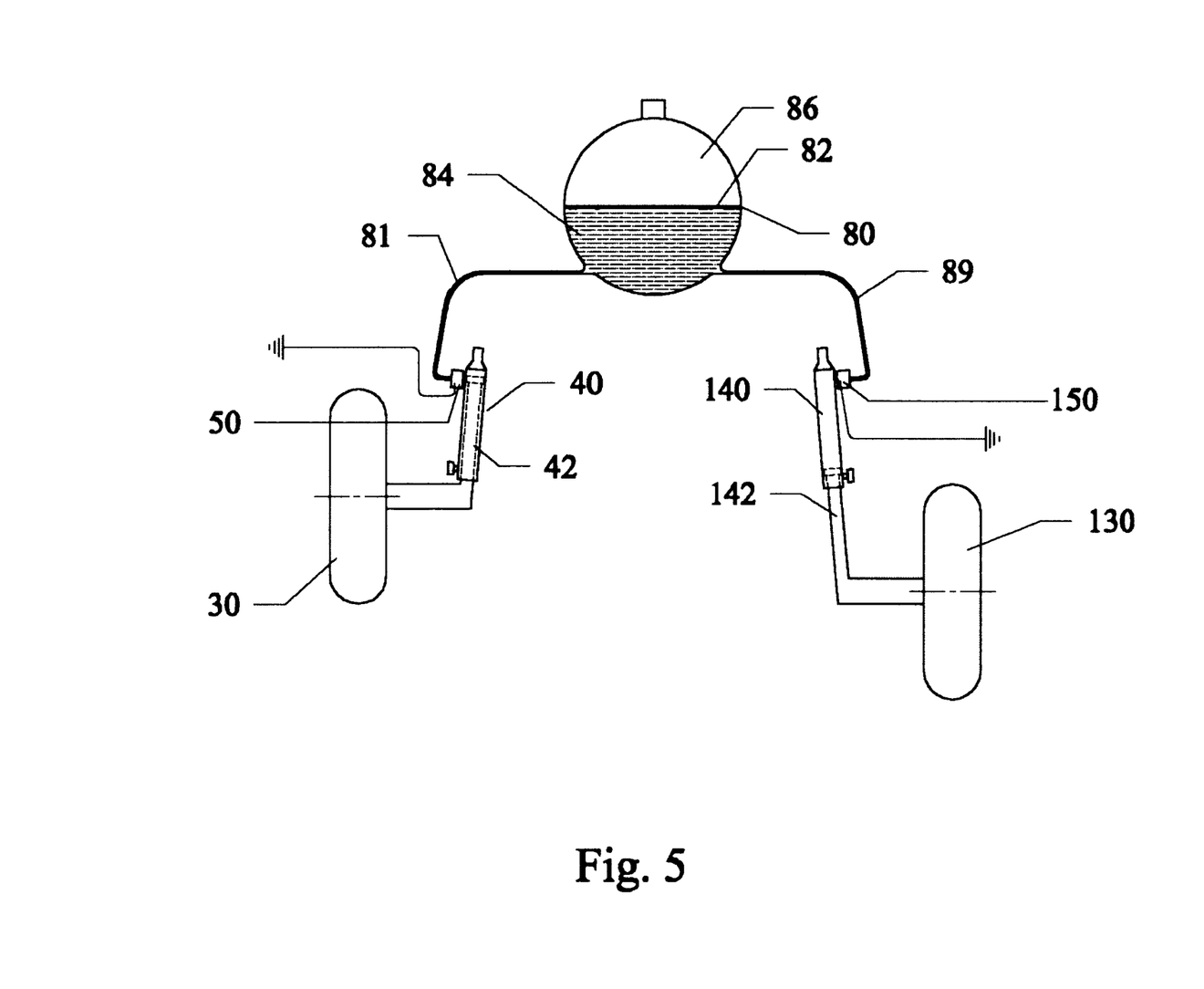
FIG. 5 shows the hydraulic system of FIG. 2 while the motorcycle is being tilted leftward.

FIG. 5 shows the hydraulic system of FIG. 2 with lockup valves 50, 150 open in unlocked positions, while the motorcycle is being tilted leftward at speeds of greater than approximately 15 miles per hour. As the motorcycle 10 of the FIG. 2 is turning left, the left piston 42 goes up into hydraulic cylinder 40 and fluid flows through line 81 to the compensator tank 80 and to the right cylinder, as the piston 142 in right cylinder 140 is extended outward therefrom. Similarly, the opposite effect occurs when the motorcycle 10 is tilted rightward.

The compensator tank 80 has an internal flexible diaphragm 82 separating an oil filled chamber 84 from an air pressurized chamber 86. By example, if the motorcycle is being ridden on a smooth road, and the left side wheel 30 runs over an obstacle such as a 2×4 piece of wood, compensator tank 80 will take up the difference in the hydraulic system. Left side wheel 30 moving upward in the direction of arrow Y causes piston 42 to move into cylinder 40 passes oil through line 81 into compensator tank 80 pushing up and being absorbed by movable diaphragm 82. Using the hydraulic cylinder described, approximately 4 ounces of fluid can be pushed through line 81 into compensator 80.

The compensator tank 80 has two purposes in reference to FIGS. 2–5. First compensator tank 80 has 20 psi of air 86 above diaphragm 82. This air pressure pushes down on oil 84 and pressurizes the oil in lines 81 and 89 and cylinders 40 and 140 while keeping pressure on swing arms 32 and 132 holding both wheels 30, 130 on the road surface similar to shock absorbers. While riding on the highway and making right and left turns this oil is transferred from one side to the other and does not affect the handling of the bike 10 in any way.

The second purpose is that compensator tank 80 takes up the differential between the travel of either wheel 30, 130 while riding on a level road surface. In the event the right wheel 130 or left wheel 30 comes into contact with an object in the road that would cause a differential between the two wheels 30, 130. Then the air 86 is compressed to take up the difference in the compensator tank 80. The air in compensator tank 86 takes up the difference between the amount of travel between the two wheels 30, 130, and does not alter the handling of the bike 10.

Figure 6:
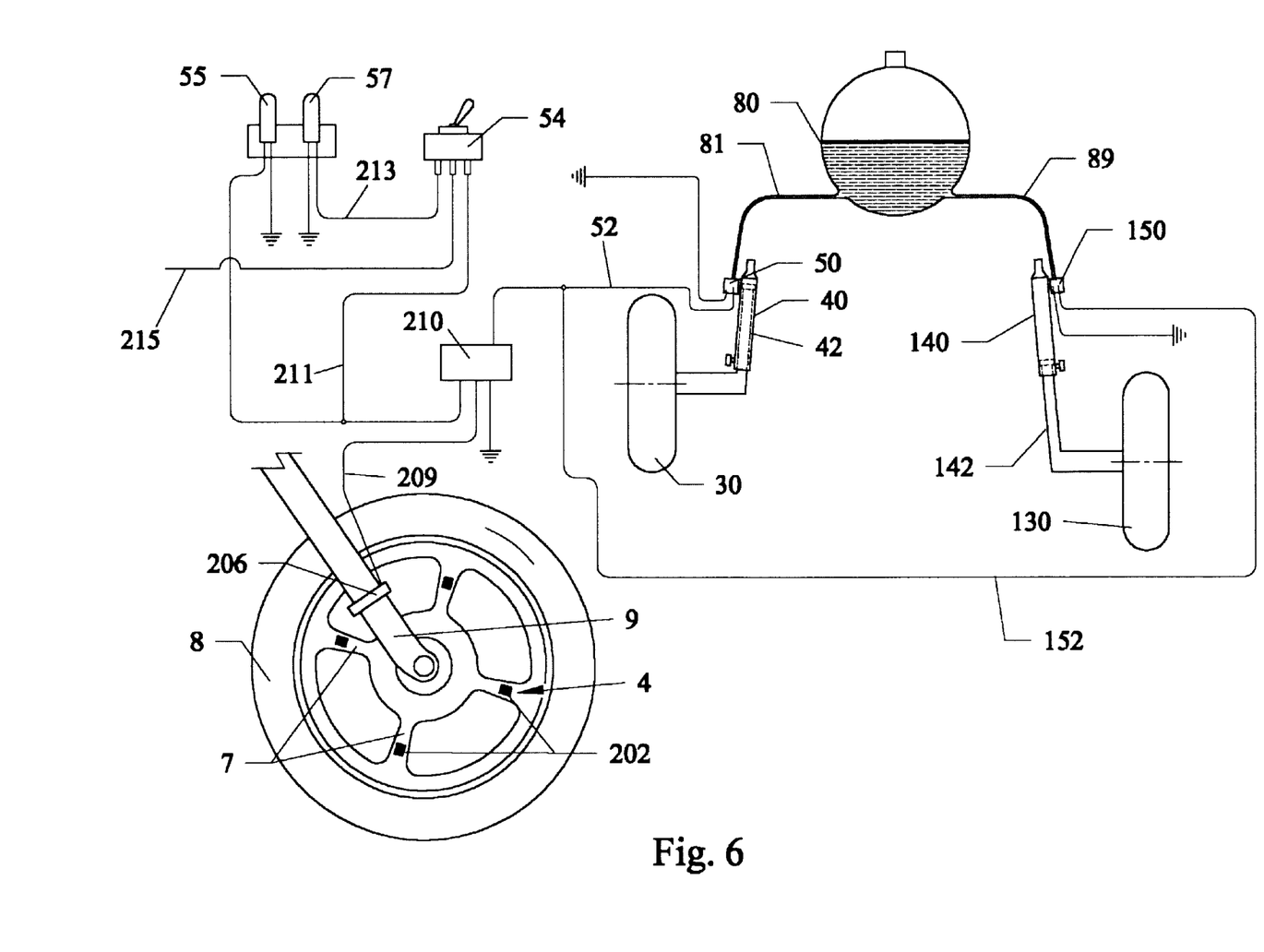
FIG. 6 shows the hydraulic system of the preceding figures connected to the safety activation control for the lockup valves.

FIG. 6 shows the hydraulic system of the preceding figures connected to the safety activation control for the lockup valves 50, 150. Left lockup valve 50 is electrically connected by line 52 to a 5 volt relay 210, and right lockup valve 150 is electrically connected by line 152 to relay 210, the latter of which connects to a pickup sensor 206 on front axle 9. Front wheel 8 of the motorcycle has magnets 202 attached to the wheel spokes 7. Relay 210 is also connected by line 211 to handlebar mounted toggle switch 54 and by line 213 to red 55 and green 57 dash mounted panel lights. Handlebar switch 54 (shown in FIG. 1) is also connected to the positive terminal of the motorcycle ignition switch(not shown). When toggle switch 54 is moved to the right, the lock valves 50, 150 are unlocked and open, the green light 57 is lit and fluid can flow in lines 81 and 89 from anyone of the cylinders 40, 140 to the compensator 80, wherein either downwardly positioned wheel 30, 130 can move upward during both turns and over uneven rough ground contoured surfaces. Moving the toggle switch 54 to the left locked position turns on the red panel light 55 so that both side wheels 30, 130 become rigid while in their downward ground engaging position. The left switch position 54 with the red light 55 allows the motorcycle to be ridden like a tricycle up to speeds of approximately 15 miles per hour. The 5 volt relay 210 is a safety feature for use when the switch 54 is in the lockup position 55(red). While the motorcycle is at a standstill and is travelling at speeds up to 15 miles per hour, the relay 210 keeps the wheels locked up so that side wheels 30, 130 stay in a rigid down position. Above speeds of approximately 15 miles per hour, the relay allows the valve controls 50, 150 to become open to allow fluid flow into lines 81, 89.

In operation, the magnets 202 on front wheel 8 rotate so that pickup sensor 206 detects the speed of the rotating wheel 8. When wheel 8 gets to approximately 15 mph, relay 210 opens allowing fluid to flow through lines 81, 89.

For drivers it is recommended that switch 54 be put in the unlocked green position 57 when the motorcycle starts traveling. The switch 54 should be moved to the lock red position 55 manually by the driver when the motorcycle is at a full stop allowing the motorcycle to stay in an upright position.

Referring to FIGS. 1–6, when the motorcycle 10 is ridden with the side wheels are locked, the motorcycle 10 handles and steers properly. When the side wheels 30, 130 are unlocked on the road, there is no handling problem. In other words, the rider can not feel the wheels 30, 130 at any speed while riding straight or in a curve. The system has been road tested on the open road and in town for over 400 miles at various speeds.

Although the preferred embodiment describes the operation of the side wheels when the wheels are already engaging the ground, the invention can be used in conjunction with U.S. Pat. No. 5,029,894 to Willman, the inventor of the subject invention, which is incorporated by reference. The side wheels can initially be raised and lowered as described in the '894 patent After the side wheels are lowered, the embodiments described above can be used to control whether the ground engaging side-wheels are in an unlock position, or a closed lock position.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A support system for side-wheels on motorcycles having front wheels and rear wheels, the support system allowing the side-wheels to follow uneven road contours and being movable during tilted turns comprising:

a mounting member attached to a frame of a motorcycle, the motorcycle having a front wheel and a rear wheel for riding over a ground surface;

a left arm having a first end pivotally attached to one side of the mounting member;

a left fluid source for controlling the left arm;

a left side-wheel attached to a second end of the left arm, the left side-wheel being biased against the ground surface;

a right arm having a first end pivotally attached to another side of the mounting member;

a right fluid source for controlling the right arm, the left fluid source being in fluid flow communication with the right fluid source;

a right side-wheel attached to a second end of the right arm, the right side-wheel being biased against the ground surface; and an activation switch for allowing each of the side-wheels to be biased downward against the ground surface, and wherein tilting the motorcycle onto the right side-wheel causes fluid from the right fluid source to flow to the left fluid source, and tilting the motorcycle onto the left side-wheel causes fluid from the left fluid source to flow to the right fluid source and, the activation switch includes a safety means for locking the right side-wheel and the left side-wheel in a downward position only while the motorcycle is standing still and up to speeds of approximately 15 miles per hour.

2. The support system for side-wheels on motorcycles of claim 1, wherein the safety means further includes:

a speed sensor attached adjacent to the front wheel of the motorcycle for determining the traveling speed of the motorcycle.

3. The support system for side-wheels on motorcycles of claim 2, wherein the sensor means includes:

a magnet attached to the front motorcycle wheel; and a pickup sensor attached to the motorcycle frame.

4. The support system for side-wheels on motorcycles of claim 1, wherein the activation switch further includes:

an unlocked position for continuously allowing each of the side wheels to move upward while travelling over uneven road contours and during turns; and a locked positioned where the side wheels stay in a rigid downward position at low speeds and move to an unlocked position at high speeds.

5. The support system for side-wheels on motorcycles of claim 4, wherein the low speeds include in the range of standing still to approximately 15 miles per hour.

6. The support system for side-wheels on motorcycles of claim 1, wherein the activation switch further includes:

a first panel light for indicating an unlocked position; and a second panel light for indicating a locked position.

7. The support system for side-wheels on motorcycles of claim 1, wherein the left fluid source and the right fluid source each include:

a hydraulic cylinder and piston controlled by a valve.

8. The support system for side-wheels on motorcycles of claim 1, further including:

a compensator means for functioning as a shock absorber for the motorcycle when at least one of the right side-wheel and the left side-wheel are running over obstacles, the compensator means being in fluid flow communication with the left fluid source and the right fluid source.

9. The support system for motorcycles of claim 8, wherein the compensator means includes:

a first chamber separated from a second chamber by a moveable diaphragm, the first chamber containing a first fluid, the second chamber containing a second fluid, the second fluid being in fluid flow communication with both the right fluid source and the left fluid source, the diaphragm being moveable into the first chamber to compress the first fluid when at least one of the right side-wheel and the left side-wheel runs over a raised obstacle on the ground surface, wherein the diaphragm takes up a differential between the right fluid source and the left fluid source caused by the obstacle.

10. A system for maintaining side-wheels on motorcycles in a ground engaging position, comprising in combination:

a motorcycle having a front wheel and a rear wheel;

ground engaging side wheels attached to each side of the motorcycle;

first and second fluid filled cylinders for causing each of the side wheels to engage the ground, the first and the second fluid filled cylinders being in fluid flow communication with one another so that tilting the motorcycle to one side causes a portion of fluid from the first fluid filled cylinder to transfer toward the second fluid filled cylinder, and tilting the motorcycle to an opposite side causes a portion of fluid from the second fluid filled cylinder to transfer toward the first fluid filled cylinder; and an activation switch having both an unlocked position and a locked position for maintaining the side wheels against the ground, the unlocked position for continuously allowing each of the side wheels to move upward while the motorcycle travels over uneven road contours and during turns at all speeds, and the locked position having the side wheels stay in a rigid downward position at low speeds and move to the unlocked position at a threshold speed.

11. The system for the side-wheels of claim 10, wherein the threshold speed includes:

an activation range of approximately 10 to approximately 18 mph.

12. The system for the side-wheels of claim 10, further including:

a speed sensor attached to the front wheel of the motorcycle, the speed sensor activates the threshold speed to move the activating switch from the locked position to the unlocked position.

13. The support system for side-wheels on motorcycles of claim 10, further including:

a compensator means for functioning as a shock absorber when at least one of the ground engaging side-wheels runs over obstacles, the compensator means being in fluid flow communication with the first and the second fluid filled cylinders.

14. The support system for motorcycles of claim 13, wherein the compensator means includes:

a first chamber separated from a second chamber by a moveable diaphragm, the first chamber containing one fluid, the second chamber containing another fluid, the another fluid being in fluid flow communication with both the first fluid filled cylinder and the second fluid filled cylinder, the diaphragm being moveable into the first chamber to compress the one fluid when at least one of the ground engaging side wheels runs over a raised obstacle on the ground surface, wherein the diaphragm takes up a differential between the first fluids filled cylinder and the second fluid filled cylinder caused by the obstacle.

15. The support system for side-wheels on motorcycles of claim 10, wherein the activation switch further includes:

a first panel light for indicating the unlocked position; and a second panel light for indicating the locked position.

16. A system for maintaining side-wheels on motorcycles in a ground engaging position, comprising in combination:

a motorcycle having a front wheel and a rear wheel on a ground surface;

left side-wheel attached to one side of the motorcycle;

left fluid means for biasing the left side-wheel to engage the ground surface;

right side-wheel attached to another side of the motorcycle opposite to the one side;

right fluid means for biasing the right side-wheel to engage the ground surface, the right fluid means being in fluid communication with the left fluid means so that tilting the motorcycle to the left side-wheel causes a portion of fluid from the left fluid means to transfer toward the right fluid means, and tilting the motorcycle to the right side-wheel causes a portion of fluid from the right fluid means to transfer toward the left fluid means; and compensator means for functioning as a shock absorber when at least one of the left sidewheel and the right side-wheel runs over obstacles, the compensator means being in fluid flow communication with both the right fluid means and the left fluid means, the compensator means including a first chamber separated from a second chamber by a moveable diaphragm, the first chamber containing one fluid, the second chamber containing another fluid, the another fluid being in fluid flow communication with both the right fluid means and the left fluid means, the diaphragm being moveable into the first chamber to compress the one fluid when at least one of the right side-wheel and the left side-wheel runs over a raised obstacle on the ground surface, wherein the diaphragm takes up a differential between the right fluid means and the left fluid means caused by the obstacle.

* * * * *